US007844504B1

(12) United States Patent
Flockhart et al.

(10) Patent No.: US 7,844,504 B1
(45) Date of Patent: Nov. 30, 2010

(54) ROUTING BASED ON THE CONTENTS OF A SHOPPING CART

(75) Inventors: Andrew D. Flockhart, Thornton, CO (US); Richard B. Hull, Morristown, NJ (US); Gregory L. Anderson, Colleyville, TX (US); Bharat Kumar, Belle Mead, NJ (US); Kevin George Irwig, North Ryde (AU)

(73) Assignee: Avaya Inc., Basking Ridge, NJ (US)

( * ) Notice: Subject to any disclaimer, the term of this patent is extended or adjusted under 35 U.S.C. 154(b) by 2444 days.

(21) Appl. No.: 09/669,486

(22) Filed: Sep. 25, 2000

Related U.S. Application Data (60) Provisional application No. 60/200,520, filed on Apr. 27, 2000.

(51) Int. Cl.
*G06Q 30/00* (2006.01)
(52) U.S. Cl. .................. 705/27; 705/26; 379/93.12; 379/266.02
(58) Field of Classification Search .............. 705/26.77, 705/27, 26; 379/93.12, 266.02
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,788,715 A | 11/1988 | Lee | |
| 4,797,911 A | 1/1989 | Szlam et al. | |
| 4,894,857 A | 1/1990 | Szlam et al. | |
| 4,953,204 A | 8/1990 | Cuschleg, Jr. et al. | |
| 5,001,710 A | 3/1991 | Gawrys et al. | |
| 5,025,468 A | 6/1991 | Sikand et al. | |
| 5,097,528 A | 3/1992 | Gursahaney et al. | |
| 5,101,425 A | 3/1992 | Darland | |
| 5,155,761 A | 10/1992 | Hammond | 379/67 |
| 5,164,983 A | 11/1992 | Brown et al. | |
| 5,185,780 A | 2/1993 | Leggett | |
| 5,206,903 A | 4/1993 | Kohler et al. | 379/309 |
| 5,210,789 A | 5/1993 | Jeffus et al. | |
| 5,214,688 A | 5/1993 | Szlam et al. | |
| 5,274,700 A | 12/1993 | Gechter et al. | |
| 5,278,898 A | 1/1994 | Cambray et al. | |
| 5,291,550 A | 3/1994 | Levy et al. | |

(Continued)

FOREIGN PATENT DOCUMENTS

CA 2143198 1/1995

(Continued)

OTHER PUBLICATIONS

No Author, "When Talk Isn't Cheap" Sm@rt Reseller, v. 3, n. 13, p. 50, Apr. 3, 2000.*

(Continued)

*Primary Examiner*—Raquel Alvarez
(74) *Attorney, Agent, or Firm*—Sheridan Ross P.C.

(57) ABSTRACT

The present invention is directed to a method and system for routing contacts in a contact center based on a number of factors including the value or nature of items in an order of the customer associated with the contact. The invention is particularly useful in E-commerce web-sites in which electronic orders are generated by the customer.

69 Claims, 3 Drawing Sheets

U.S. PATENT DOCUMENTS

| | | | |
|---|---|---|---|
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | 379/266 |
| 5,530,744 A | 6/1996 | Charalambous et al. | |
| 5,537,470 A | 7/1996 | Lee | |
| 5,537,542 A | 7/1996 | Eilert et al. | |
| 5,544,232 A | 8/1996 | Baker et al. | |
| 5,546,452 A | 8/1996 | Andrews et al. | |
| 5,592,378 A | 1/1997 | Cameron et al. | 395/227 |
| 5,592,542 A | 1/1997 | Honda et al. | |
| 5,594,726 A | 1/1997 | Thompson et al. | 370/485 |
| 5,606,361 A | 2/1997 | Davidsohn et al. | 348/14 |
| 5,611,076 A | 3/1997 | Durflinger et al. | |
| 5,627,884 A | 5/1997 | Williams et al. | 379/67 |
| 5,642,515 A | 6/1997 | Jones et al. | |
| 5,684,872 A | 11/1997 | Flockhart et al. | 379/266 |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,724,092 A | 3/1998 | Davidsohn et al. | 348/14 |
| 5,740,238 A | 4/1998 | Flockhart et al. | 379/221 |
| 5,742,675 A | 4/1998 | Kilander et al. | |
| 5,748,468 A | 5/1998 | Notenboom et al. | |
| 5,749,079 A | 5/1998 | Yong et al. | |
| 5,751,707 A | 5/1998 | Voit et al. | 370/384 |
| 5,752,027 A | 5/1998 | Familiar | |
| 5,754,639 A | 5/1998 | Flockhart et al. | 379/221 |
| 5,754,776 A | 5/1998 | Hales et al. | |
| 5,754,841 A | 5/1998 | Carino, Jr. | |
| 5,757,904 A | 5/1998 | Anderson | |
| 5,790,677 A | 8/1998 | Fox et al. | 380/24 |
| 5,793,861 A | 8/1998 | Haigh | |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,818,907 A | 10/1998 | Maloney et al. | |
| 5,825,869 A | 10/1998 | Brooks et al. | |
| 5,828,747 A | 10/1998 | Fisher et al. | 379/309 |
| 5,838,968 A | 11/1998 | Culbert | |
| 5,839,117 A | 11/1998 | Cameron et al. | 705/27 |
| 5,875,437 A | 2/1999 | Atkins | 705/40 |
| 5,880,720 A | 3/1999 | Iwafune et al. | 345/327 |
| 5,881,238 A | 3/1999 | Aman et al. | |
| 5,884,032 A | 3/1999 | Bateman et al. | 395/200.34 |
| 5,889,956 A | 3/1999 | Hauser et al. | |
| 5,897,622 A | 4/1999 | Blinn et al. | 705/26 |
| 5,903,641 A | 5/1999 | Tonisson | |
| 5,903,877 A | 5/1999 | Berkowitz et al. | 705/26 |
| 5,905,793 A | 5/1999 | Flockhart et al. | 379/266 |
| 5,915,012 A | 6/1999 | Miloslavsky | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,943,416 A | 8/1999 | Gisby | |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | 364/479.02 |
| 6,011,844 A | 1/2000 | Uppaluru et al. | |
| 6,012,144 A | 1/2000 | Pickett | |
| 6,021,428 A | 2/2000 | Miloslavsky | |
| 6,038,293 A | 3/2000 | Mcnerney et al. | |
| 6,044,144 A | 3/2000 | Becker et al. | |
| 6,044,205 A | 3/2000 | Reed et al. | 395/200.31 |
| 6,044,355 A | 3/2000 | Crockett et al. | |
| 6,049,547 A | 4/2000 | Fisher et al. | 370/412 |
| 6,052,723 A | 4/2000 | Ginn | |
| 6,055,308 A | 4/2000 | Miloslavsky et al. | |
| 6,058,435 A | 5/2000 | Sassin et al. | |
| 6,064,730 A * | 5/2000 | Ginsberg | 379/265 |
| 6,064,731 A | 5/2000 | Flockhart et al. | 379/265 |
| 6,084,954 A | 7/2000 | Harless | |
| 6,088,441 A | 7/2000 | Flockhart et al. | 379/265 |
| 6,088,444 A * | 7/2000 | Walker et al. | 379/266.02 |
| 6,115,462 A | 9/2000 | Servi et al. | |
| 6,151,571 A | 11/2000 | Pertrushin | |
| 6,154,769 A | 11/2000 | Cherkasova et al. | |
| 6,163,607 A | 12/2000 | Bogart et al. | 379/266 |
| 6,173,053 B1 | 1/2001 | Bogart et al. | 379/266 |
| 6,175,564 B1 | 1/2001 | Miloslavsky et al. | |
| 6,178,441 B1 | 1/2001 | Elnozahy | |
| 6,182,059 B1 | 1/2001 | Angotti et al. | |
| 6,185,292 B1 | 2/2001 | Miloslavsky | |
| 6,192,122 B1 | 2/2001 | Flockhart et al. | 379/266 |
| 6,215,865 B1 | 4/2001 | McCalmont | |
| 6,226,377 B1 | 5/2001 | Donaghue, Jr. | |
| 6,229,819 B1 | 5/2001 | Darland et al. | |
| 6,230,183 B1 | 5/2001 | Yocom et al. | |
| 6,233,333 B1 | 5/2001 | Dezonmo | |
| 6,240,417 B1 | 5/2001 | Eastwick | |
| 6,259,969 B1 | 7/2001 | Tackett et al. | |
| 6,263,066 B1 | 7/2001 | Shtivelman et al. | |
| 6,263,359 B1 | 7/2001 | Fong et al. | |
| 6,272,544 B1 | 8/2001 | Mullen | |
| 6,275,806 B1 | 8/2001 | Pertrushin | |
| 6,275,812 B1 | 8/2001 | Haq et al. | |
| 6,275,991 B1 | 8/2001 | Erlin | |
| 6,278,777 B1 | 8/2001 | Morley | |
| 6,292,550 B1 | 9/2001 | Burritt | |
| 6,295,353 B1 | 9/2001 | Flockhart et al. | 379/265 |
| 6,353,810 B1 | 3/2002 | Petrushin | |
| 6,356,632 B1 | 3/2002 | Foster et al. | |
| 6,366,668 B1 | 4/2002 | Borst et al. | 379/266.04 |
| 6,389,028 B1 | 5/2002 | Bondarenko et al. | 370/401 |
| 6,389,132 B1 | 5/2002 | Price | |
| 6,389,400 B1 | 5/2002 | Bushey et al. | |
| 6,424,709 B1 | 7/2002 | Doyle et al. | |
| 6,426,950 B1 | 7/2002 | Mistry | |
| 6,427,137 B2 | 7/2002 | Petrushin | |
| 6,430,282 B1 | 8/2002 | Bannister et al. | 379/211.02 |
| 6,434,230 B1 | 8/2002 | Gabriel | |
| 6,449,356 B1 | 9/2002 | Dezonno | 379/265.01 |
| 6,449,358 B1 | 9/2002 | Anisimov et al. | |
| 6,449,646 B1 | 9/2002 | Sikora et al. | |
| 6,453,038 B1 | 9/2002 | McFarlane et al. | 379/265.05 |
| 6,463,148 B1 | 10/2002 | Brady | |
| 6,463,346 B1 | 10/2002 | Flockhart et al. | 700/102 |
| 6,463,415 B2 | 10/2002 | St. John | |
| 6,480,826 B2 | 11/2002 | Pertrushin | |
| 6,490,350 B2 | 12/2002 | McDuff et al. | |
| 6,535,294 B1 * | 3/2003 | Arledge et al. | 358/1.15 |

| | | | |
|---|---|---|---|
| 6,535,600 B1 | 3/2003 | Fisher et al. | 379/265.12 |
| 6,535,601 B1 | 3/2003 | Flockhart et al. | |
| 6,560,330 B2 | 5/2003 | Gabriel | |
| 6,560,649 B1 | 5/2003 | Mullen et al. | |
| 6,560,707 B2 | 5/2003 | Curtis et al. | |
| 6,563,920 B1 | 5/2003 | Flockhart et al. | |
| 6,574,329 B2 | 6/2003 | Takeuchi et al. | |
| 6,597,685 B2 * | 7/2003 | Miloslavsky et al. | 370/352 |
| 6,614,903 B1 | 9/2003 | Flockhart et al. | |
| 6,650,748 B1 | 11/2003 | Edwards et al. | |
| 6,697,457 B2 | 2/2004 | Petrushin | |
| 6,704,409 B1 | 3/2004 | Dilip et al. | |
| 6,707,903 B2 | 3/2004 | Qutub et al. | |
| 6,714,643 B1 | 3/2004 | Gargeya et al. | |
| 6,724,884 B2 | 4/2004 | Jensen et al. | |
| 6,741,699 B1 | 5/2004 | Flockhart et al. | |
| 6,754,333 B1 | 6/2004 | Flockhart et al. | |
| 6,947,543 B2 | 9/2005 | Alvarado et al. | |
| 7,035,927 B2 | 4/2006 | Flockhart et al. | |
| 7,158,628 B2 | 1/2007 | McConnell et al. | |
| 7,366,779 B1 | 4/2008 | Crawford | |
| 2002/0118816 A1 | 8/2002 | Flockhart et al. | 379/265.12 |
| 2002/0181692 A1 | 12/2002 | Flockhart et al. | 379/265.02 |
| 2002/0194002 A1 | 12/2002 | Petrushin | |
| 2003/0174830 A1 | 9/2003 | Boyer et al. | |
| 2003/0177017 A1 | 9/2003 | Boyer et al. | |
| 2004/0203878 A1 | 10/2004 | Thomson | |
| 2005/0071211 A1 | 3/2005 | Flockhart et al. | |
| 2007/0230681 A1 | 10/2007 | Boyer et al. | |
| 2008/0275751 A1 | 11/2008 | Flockhart et al. | |
| 2008/0275752 A1 | 11/2008 | Flockhart et al. | |
| 2008/0275766 A1 | 11/2008 | Flockhart et al. | |

FOREIGN PATENT DOCUMENTS

| | | |
|---|---|---|
| CA | 2174762 | 3/1996 |
| EP | 0501189 | 9/1992 |
| EP | 0740450 | 10/1996 |
| EP | 0772335 | 5/1997 |
| EP | 0 829 996 A2 | 3/1998 |
| EP | 0855826 | 7/1998 |
| EP | 0 866 407 A1 | 9/1998 |
| EP | 0863651 | 9/1998 |
| EP | 899673 | 3/1999 |
| EP | 998108 | 5/2000 |
| EP | 1091307 | 4/2001 |
| EP | 1150236 | 10/2001 |
| GB | 2273418 | 6/1994 |
| GB | 2290192 | 12/1995 |
| JP | 07-134743 | 5/1995 |
| JP | 10-173780 | 6/1998 |
| JP | 10-304073 | 11/1998 |
| JP | 10-304074 | 11/1998 |
| JP | 11-017806 | 1/1999 |
| JP | 11-163860 | 6/1999 |
| JP | 11-514515 | 12/1999 |
| JP | 2000-092213 | 3/2000 |
| WO | WO 96/07141 | 3/1996 |
| WO | WO 97/28635 | 8/1997 |
| WO | WO 98/56207 | 12/1998 |
| WO | WO 99/65214 | 12/1999 |
| WO | WO 01/17215 A1 | 3/2001 |

OTHER PUBLICATIONS

No Author, "eGain's Commerce 2000 Platform Sets New Standard for eCommerce Customer Communications" Business Wire Nov. 15, 1999.*

Doo-Hyun Kim et al. Collaborative Multimedia Middleware Architecture and Advanced Internet Call Center ProceedingsInternational Conference on Information Networking (Jan. 31, 2001), pp. 246-250.

U.S. Appl. No. 11/000686, filed Nov. 30, 2004, Flockhart.

"Applications, NPRI's Predictive Dialing Package," Computer Technology (Fall 1993), p. 86.

"Call Center Software You Can't Outgrow," Telemarketing® (Jul. 1993), p. 105.

"Domain Name Services," available at http://www.pism.com/chapt09/chapt09.html, downloaded Mar. 31, 2003, 21 pages.

"Internet Protocol Addressing," available at http://samspade.org/d/ipdns.html, downloaded Mar. 31, 2003, 9 pages.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

"VAST™, Voicelink Application Software for Teleservicing®," System Manager User's Guide, Digital Systems (1994), pp. ii, vii-ix, 1-2, 2-41 through 2-77.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Avaya, Inc. Business Advocate Options, at http://www.avaya.com, downloaded on 2/15/03, Avaya, Inc. 2003.

Avaya, Inc. Business Advocate Product Summary, at http://www.avaya.com, downloaded on Feb. 15, 2003, Avaya, Inc. 2003, 3 pages.

Avaya, Inc. CentreVu Advocate, Release 9, User Guide, Dec. 2000.

Avaya, Inc., "Better Implementation of IP in Large Networks," Avaya, Inc. 2002, 14 pages.

Avaya, Inc., "The Advantages of Load Balancing in the Multi-Call Center Enterprise," Avaya, Inc., 2002, 14 pages.

Avaya, Inc., "Voice Over IP Via Virtual Private Networks: An Overview," Avaya, Inc., Feb. 2001, 9 pages.

Background of the Invention for the above-captioned application (previously provided).

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Chavez, David, et al., "Avaya MultiVantage Software: Adapting Proven Call Processing for the Transition to Converged IP Networks," Avaya, Inc., Aug. 2002.

Coles, Scott, "A Guide for Ensuring Service Quality in IP Voice Networks," Avaya, Inc., 2002, pp. 1-17.

Dawson, "NPRI's Powerguide, Software Overview" Call Center Magazine (Jun. 1993), p. 85.

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz, printed Feb. 10, 2003; 8 pages.

Foster, Robin, et al., "Avaya Business Advocate and its Relationship to Multi-Site Load Balancing Applications," Avaya, Inc., Mar. 2002, 14 pages.

Geotel Communications Corporation Web site printout entitled "Intelligent CallRouter" Optimizing the Interaction Between Customers and Answering Resources, 1998, 6 pages.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

L.F. Lamel and J.L. Gauvain, Language Identification Using Phone-Based Acoustic Likelihood, ICASSP-94, date unknown; 4 pages.

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

International Preliminary Examination Report for International (PCT) Patent Application No. PCT/US01/29109, mailed Jul. 19, 2004.

International Search Report for International (PCT) Patent Application No. PCT/US01/29109, mailed Nov. 23, 2001.

Written Opinion for International (PCT) Patent Application No. PCT/US01/29109, mailed Jul. 22, 2003.

* cited by examiner

ROUTING BASED ON THE CONTENTS OF A SHOPPING CART

CROSS REFERENCE TO RELATED APPLICATIONS

The present application is related to U.S. Provisional patent application Ser. No. 60/200,520, filed on Apr. 27, 2000, and entitled "WAIT TIME PREDICTION ARRANGEMENT FOR NON-REAL-TIME CUSTOMER CONTACTS"; U.S. patent application Ser. No. 09/641,403, filed Aug. 17, 2000, and having the same title; and U.S. patent application Ser. No. 09/669,257, filed concurrently herewith and entitled "AN ARRANGEMENT FOR CONTROLLING THE VOLUME AND TYPE OF CONTACTS IN AN INTERNET CALL CENTER", each of which is incorporated herein by this reference.

FIELD OF THE INVENTION

The present invention relates generally to routing contacts based on predetermined criteria and specifically to routing contacts in an Internet call center.

BACKGROUND OF THE INVENTION

E-commerce web-sites are becoming increasingly popular with consumers as an efficient, convenient and low cost way to shop for merchandise. In a typical E-commerce web-site, the customer's web browser accesses web pages provided by the web-site's web server. The customer can add merchandise to be purchased to a "shopping cart" by clicking on an icon. The shopping cart is a data structure typically stored on the customer's computer or on the web server. When the customer desires to complete the order, the data structure is forwarded along with a cookie identifying the customer to the web server which processes the order.

Each year hundreds of millions dollars of potential business are lost in E-commerce web-sites due to the failure of a customer to complete an order. Studies have shown that a significant number of shopping carts in E-commerce web-sites are abandoned because the customer is unable to obtain timely or appropriate service from the Internet call center supporting the web-site. In many cases, the customer has questions before he can complete the order which can only be answered by speaking with a working agent at the Internet call center. In other cases, the customer must speak to a working agent at the Internet call center to complete the order.

SUMMARY OF THE INVENTION

These and other needs are addressed by the methods and architectures of the present invention. The invention is generally directed to the routing of a contact to a contact center based on one or more of the identification of a customer, a file address associated with the customer, the historical business relationship with the customer, an estimated business value of the customer, one or more of the items in an order or collection of item(s) of the customer, and/or a value of one or more of the items in the collection of item(s). This information is typically used to decide on the quality and/or skills of the agent needed to service the contact and/or the prioritization of the contact to provide more desirable customers with lower queue wait times.

In a first embodiment of the present invention, a method for routing contacts in a contact center is provided that includes the steps of:

(a) evaluating a collection of one or more items (e.g., a data structure such as a shopping cart, an electronic order such as a fax, a webform, e-mail text, voice call, VoIP, text chat, electronic documents, voice message, etc.) of a customer, e.g., to identify at least one of (i) at least one item in the collection and (ii) a value of at least one item in the collection; and (b) routing a contact of the customer to at least one of a working agent and queue in the contact center based at least one of (i) and (ii). As will be appreciated, the contact can be in the form of a voice communication or an electronic communication, such as e-mail, fax, webform, VoIP, and voice message. The use of the value of item(s) in the collection and/or type(s) of item(s) in the collection to determine the quality and skills of the agent to service the customer and/or to prioritize the contact should curtail abandonment of high-value transactions and thereby reduce overall business losses.

In one configuration, the collection of one or more items is an electronic order accessed via a network by a computational component associated with the contact center. The computational component can be an applet or similar software architecture. As will be appreciated, an applet is an application program, such as an application program that is downloaded automatically through a World Wide Web browser and executed on the recipient's computer. This configuration is particularly useful in E-commerce web-sites associated with an Internet contact center.

In a configuration for the Internet, the steps typically preceding the routing step are:

(a) providing the customer with at least one web page that describes (or lists) one or more items; and (b) clicking on an icon on the at least one web page. The icon can be a contact icon, an icon associated in some way with an item (e.g., clicking on the icon causes the item to be added to a shopping cart, wish cart, or wish list). As used herein, a "web page" is a file of information made available for viewing, such as a file made available for viewing on the World Wide Web, and typically seen by the user as a page of information on the screen, and an "icon" is a picture or figure or symbol on a display that represents a particular object, operation and/or group of files.

In another configuration, the method includes the step of comparing (i) and/or (ii) with predetermined information (e.g., a file or set of one or more items and/or a value) to determine the objective or destination of the routing step. The objective of the routing step, for example, is a queue or a working agent.

In another embodiment, a system for servicing contacts in a contact center is provided that includes:

(a) evaluating means (e.g., software) for evaluating a collection of one or more items of a customer to determine at least one of (i) one or more item(s) in the collection and (ii) a value(s) of one or more item(s) in the collection; and (b) routing means (e.g., software) for routing a contact of the customer to at least one of a working agent and queue in the contact center based on (i) and/or (ii).

In yet another embodiment, a system for servicing contacts in a contact center is provided that includes:

(a) an evaluator for evaluating a collection of one or more items of a customer to determine at least one of (i) one or more item(s) in the collection and (ii) the value(s) of one or more item(s) in the collection; and (b) a router for routing a contact of the customer to at least one of a working agent and queue in the contact center based on (i) and/or (ii).

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
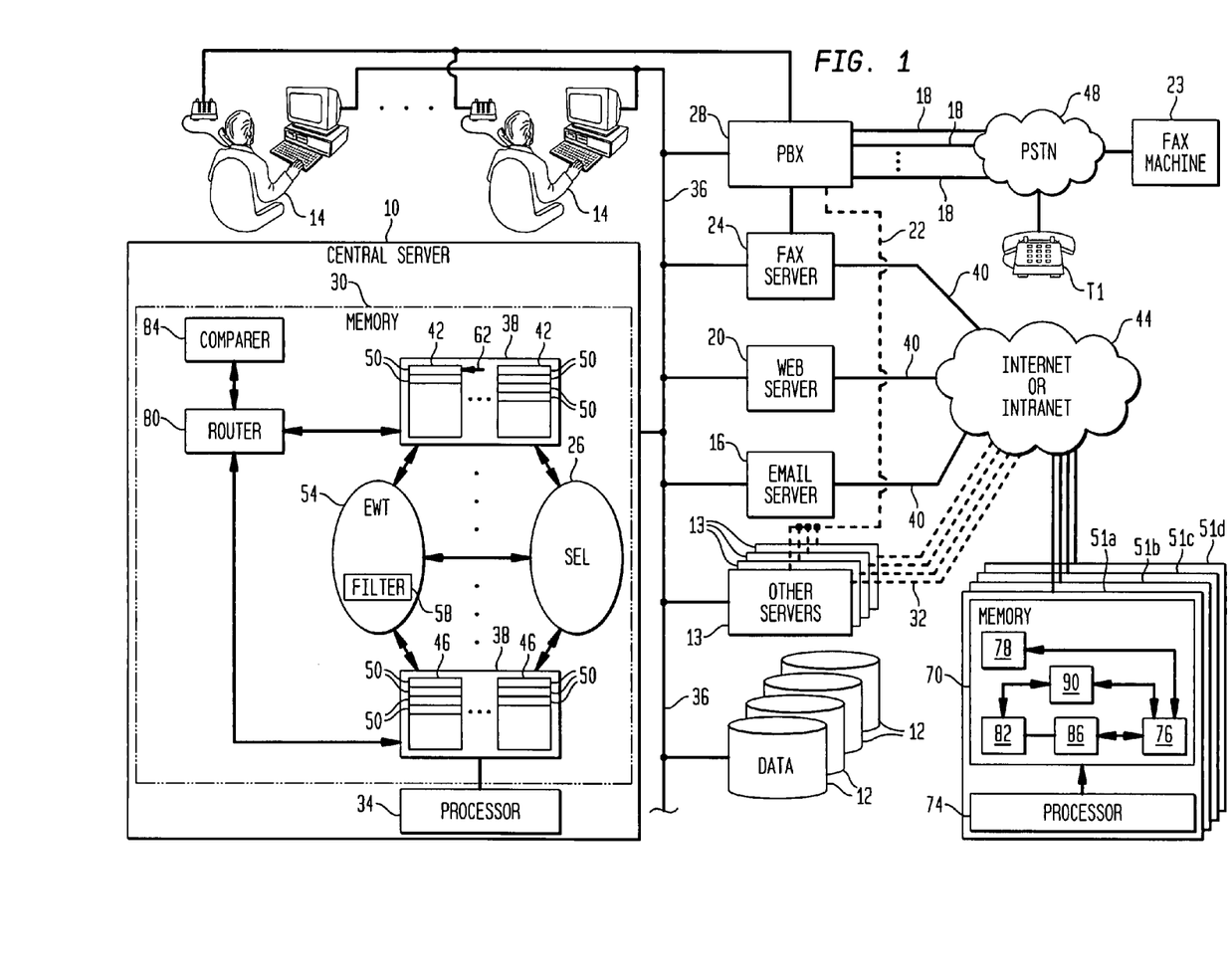
FIG. 1 is a block diagram of a contact center according to a first embodiment of the present invention.

FIG. 1 shows an illustrative embodiment of the present invention. A contact center comprises a central server 10 (such as a modified version of the CRM Central 2000 Server™ of Lucent Technologies, Inc.), a set of data stores or databases 12 containing contact or customer related information and other information that can enhance the value and efficiency of the contact, and a plurality of servers, namely a fax server 24, a web server 20, an email server 16, and other servers 13, a private branch exchange PBX 28 (or private automatic exchange PAX), a plurality of working agents 14 operating computer work stations, such as personal computers, and/or telephones or other type of voice communications equipment, all interconnected by a local area network LAN (or wide area network WAN) 36. The fax server 24, web server 20 and email server 16 are connected via communication connections 40 to an Internet and/or intranet 44. The other servers 13 can be connected via optional communication lines 22, 32 to the PBX 28 and/or Internet or intranet 44. As will appreciated, other servers 13 could include a scanner (which is normally not connected to the PBX 28 or Internet or intranet 44), interactive voice recognition IVR software, VoIP software, video call software, voice messaging software, an IP voice server, and the like. The PBX 28 is connected via a plurality of trunks 18 to the public switch telecommunication network PSTN 48 and to the fax server 24 and telephones of the agents 14. As will be appreciated, faxes can be received via the PSTN 48 or via the Internet or intranet 44 by means of a suitably equipped personal computer. The PBX 28, fax server 24, email server 16, web server 20, and database 12 are conventional.

In the architecture of FIG. 1 when the central server 10 forwards a voice contact to an agent, the central server 10 also forwards information from databases 12 to the agent's computer work station for viewing (such as by a pop-up display) to permit the agent to better serve the customer.

As will be appreciated, the central server 10 is notified via LAN 36 of an incoming real-time or non-real-time contact by the telecommunications component (e.g., PBX 28, fax server 24, email server 16, web server 20, and/or other server 13) receiving the incoming contact. The incoming contact is held by the receiving telecommunications component until the central server 10 forwards instructions to the component to forward the contact to a specific station or agent 14. The server 10 distributes and connects these contacts to stations 14 of available agents based on set of predetermined criteria. The agents 14 process the contacts sent to them by the central server 10.

The memory 30 includes a plurality of sets 38 of call queues 42 and 46. Each set 38 of call queues 42 and 46 conventionally serves and holds contacts for a different work type and/or for real- versus non-real-time contacts. In the depicted embodiment, queues 42 serve non-real-time contacts while queues 46 serve real-time contacts. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness. Within each set 38 of queues 42 and 46, each queue holds contacts of a different priority and/or different type (e.g., e-mail, fax, electronic or paper documents, webform submissions, voice messages, voice calls, VoIP calls, text chat, video calls, and the like). The priority of a contact is determined according to well known predefined criteria. Depending upon the type of contact (e.g., voice, e-mail, fax, electronic or paper documents, etc.), the priority of a contact is determined according to well known predefined criteria, as set forth in copending U.S. application Ser. No. 09/669,257 "An Arrangement for Controlling the Volume and Type of Contacts in an Internet Call Center", filed concurrently herewith, which is incorporated herein by this reference, and/or as set forth below.

Each queue 42 and 46 normally functions as a first-in, first-out (FIFO) buffer memory, and includes a plurality of entries, or positions 50, each for identifying a corresponding one enqueued contact. The position 50 at the head of the queue is considered to be position 1, the next subsequent position 50 to be position number 2, and so forth.

Memory 30 further includes an estimated wait time (EWT) function, (or waiting time predictor) 54. As its name implies, this function determines an estimate of how long a contact that is placed in a queue 42 or 46 will have to wait before being delivered to an agent 14 for servicing. The estimate is derived separately by EWT function 54 for each queue 42 or 46 of each set 38.

For real-time contacts, the estimate is based on the average rate of advance of calls through positions 50 of the contacts' corresponding queue 46. An illustrative implementation of EWT function 54 for real-time contacts is disclosed by U.S. Pat. No. 5,506,898.

For non-real-time contacts, the estimate is determined differently than for real-time contacts. The technique(s) for estimating the EWT is set forth in copending U.S. Provisional Application entitled "WAIT TIME PREDICTION ARRANGEMENT FOR NON-REAL-TIME CUSTOMER CONTACTS" having Ser. No. 60/200,520 and a filing date of Apr. 27, 2000, and in copending U.S. patent application Ser. No. 09/641,403, filed concurrently herewith and having the same title, and which are incorporated herein by this reference. The system records the time at which each item is serviced from its respective queue. The advance time is then calculated by measuring the time interval between the time of servicing of a first item in the first position 50 at the head of the queue and the time of servicing of a second, later item in the second position. Stated another way, the advance time is determined by the following equation:

Advance Time=(the time of servicing of the second item)−(the time of servicing of the first item).

The weighted average advance time WAT can then be determined using the advance time, the Estimated Wait Time EWT using the WAT.

To guard against substantial fluctuations in the advance time from certain types of events, a filter 58 is provided. The processor 34 sets an indicator 62 when a predetermined type of event occurs and the filter 58 discards the advance time associated with the marked item. Predetermined types of events are as follows:

(a) The respective queue has no working agents available for servicing items from the queue. This event occurs, for example, after normal working hours when the contact center is unstaffed. Non-real-time contacts will remain in the queue during the unstaffed period.

(b) The respective queue is empty. This event occurs, for example, during quiet periods in which there are no items in the queue.

(c) The system clock is changed. This event occurs, for example, when the system clock is changed to or from daylight savings time. Non-real-time contacts may remain in the queue during the clock change.

(d) The system is nonoperational. This event occurs, for example, when the system is down for a time and then rebooted. Non-real-time contacts may persist in the queue during the period the system is shut down.

(e) The agent defers the servicing of an enqueued item.

Memory 30 can further include a contact-selection (SEL) function 26. Function 26 is conventional in that, for each contact at the head of a queue, it determines, for real-time a current or oldest wait time or CWT, the weighted average advance time WAT, the expected wait time EWT, and/or the predicted wait time PWT (which is the sum of the CWT and WAT), and, for each available agent, it selects a contact from queues 42 and/or 46 for connection to and handling by that agent. This feature is further described in U.S. Pat. No. 5,905,793, which is incorporated herein by this reference.

In FIG. 1, the center 10 is shown as being connected via communication lines 40 to a plurality of interfaces 51a-d (e.g., graphical user interfaces, etc.) between a customer and the contact center. As will be appreciated, communication lines 40 can alternatively conduct voice energy from a contacting entity.

The center 10 can be connected to a web server 20 to provide collections (or files) of information stored in the memory (not shown) of the web server 20 for viewing by a contacting entity via trunks 40 and interfaces 51. As will be appreciated, the files of information, such as web pages, can include features such as contact icons or informational messages to facilitate service of the contacting entity by the contact center 10, and/or information regarding merchandise and/or services for sale to the contacting entity.

To prioritize contacts, particularly contacts related to potential business sales, the memory 30 includes a router 80 for routing contacts to the appropriate queue 42 or 46 and a comparer 84 for providing input to the router 80 relating to the relative priority of each such contact.

Each interface 51a-d is typically a computer, such as a personal computer, that includes a memory 70 and attached processor 74. The memory 70 includes a web browser 76, one or more web pages 78, a data structure 82, such as a shopping cart, for recording items (goods or services) selected by the customer for possible purchase, an identifier 86, such as a cookie, that is unique to the customer and is referenced in some manner by the data structure 82, and an evaluator 90, such as an applet, for examining or evaluating the contents of the data structure 82 in response to a signal from the contact center 10. As will be appreciated, a "cookie" is information that is stored on a user's computer by a browser, typically at the request of software at a web-site. Web-sites typically use cookies to recognize users who have previously visited them.

Figure 2:
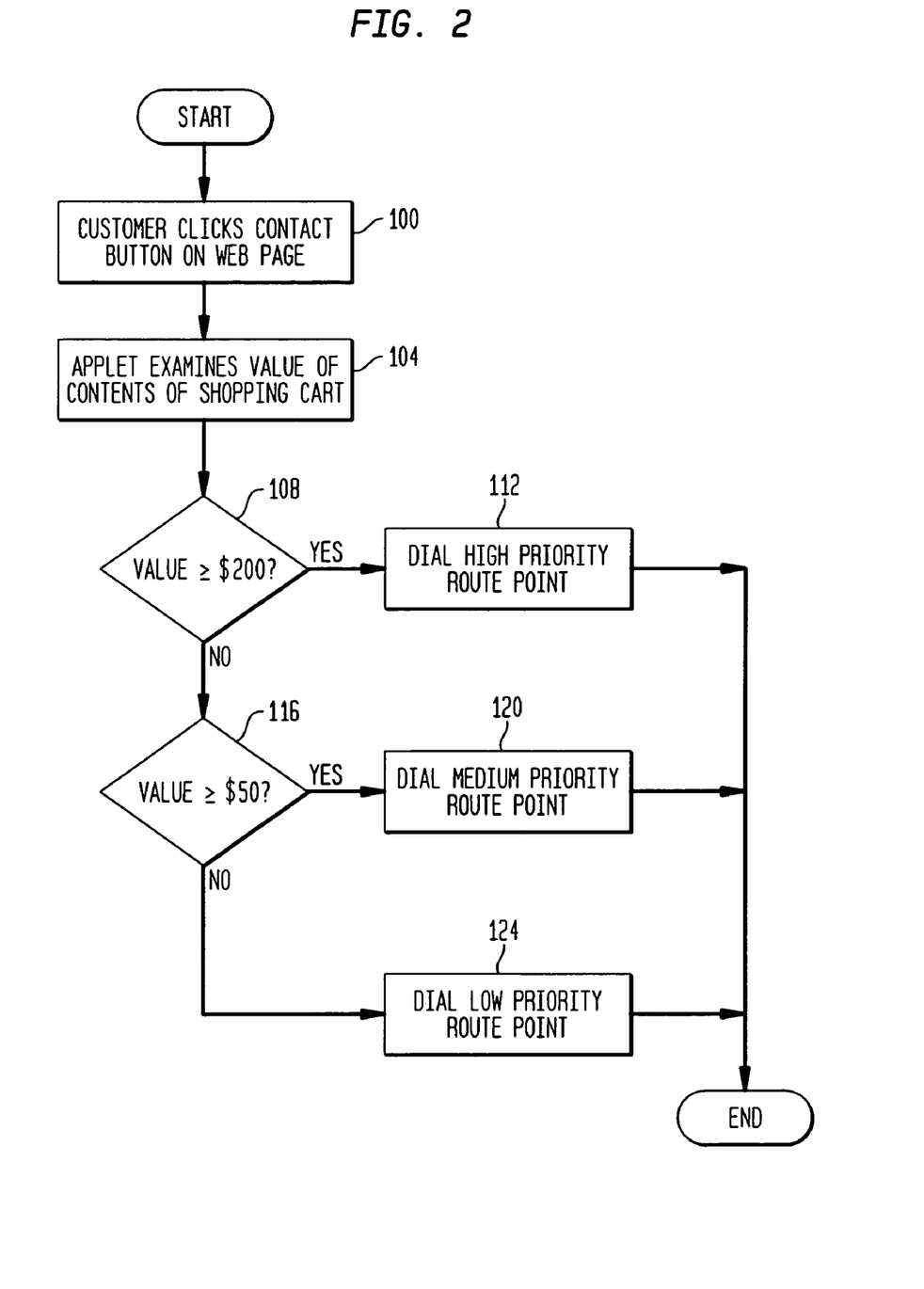
FIG. 2 is a flowchart depicting a method of operation of the contact center according to a second embodiment of the present invention.

The operation of the router 80 and comparer 84 will now be described with reference to FIGS. 1 and 2. After a customer has viewed one or more web pages 78 and selected one or more items that have been recorded in the data structure 82, the customer in box 100 sends a message to the contact center 10, such as by clicking on an icon on a web page. The signal may itself be a contact for handling by a working agent 14 or initiate a contact with a working agent 14. For example, the signal may contain the data structure 82 and attached cookie 86 and seek processing or completion of an order. Alternatively, the signal could be a request for assistance via a voice or electronic contact. Examples include an IP call from the customer's computer to the agent's computer, a voice call through a voice network that operates in collaboration with a datalink, escorted browsing of the customer by the agent over an IP link, a direct voice contact with an agent, and the like. In that event, the working agent or the customer could initiate the contact. For example, the customer can call the contact center or click a contact icon to cause the working agent to initiate a call to the customer.

In box 104, the evaluator 90 determines the value of one or more items in the data structure 82. The evaluator 90 could, for example, determine the total value of the items in the data structure 82. Alternatively or at the same time, the evaluator 90 could determine the value of the highest value item in the data structure 82. Other permutations are possible, such as determining the average value of items in the data structure 82. The evaluator 90 can perform this step in response to the clicking of the button in box 100 and/or continuously or periodically during the customer's viewing of web pages 78. In any event, the evaluator 90 forwards a signal to the comparer 84 via trunk 40 containing the results of the examination of the data structure 82.

In decision diamond 108, the comparer 84 compares the value of the item(s) in the data structure 82 with a first predetermined value. In this case, the predetermined value is shown as being $200, though any value can be used depending upon the application. If the value of the item(s) in the data structure 82 equals or exceeds the first predetermined value, the router 80 in box 112 assigns a high priority to the contact or signal and directs the contact to a high priority route point or queue. As will be appreciated, the route point is referred to as a Vector Directory Number or VDN in the Definity® architecture of Lucent Technologies, Inc.

If the value of the item(s) in the data structure 82 is less than the first predetermined value, the processor 34 proceeds to decision diamond 116 in which the comparer 84 compares the value of the item(s) in the data structure to a second, lower predetermined value. In this case, the predetermined value is shown as being $50, though any value can be used depending upon the application. If the value of the item(s) in the data structure 82 equals or exceeds the first predetermined value, the router 80 in box 120 assigns a medium priority to the contact or signal and directs the contact to a medium priority route point or queue.

If the value of the item(s) in the data structure 82 is less than the first predetermined value, the router 80 in box 124 assigns a low priority to the contact or signal and directs the contact to a low priority route point or queue.

Figure 3:
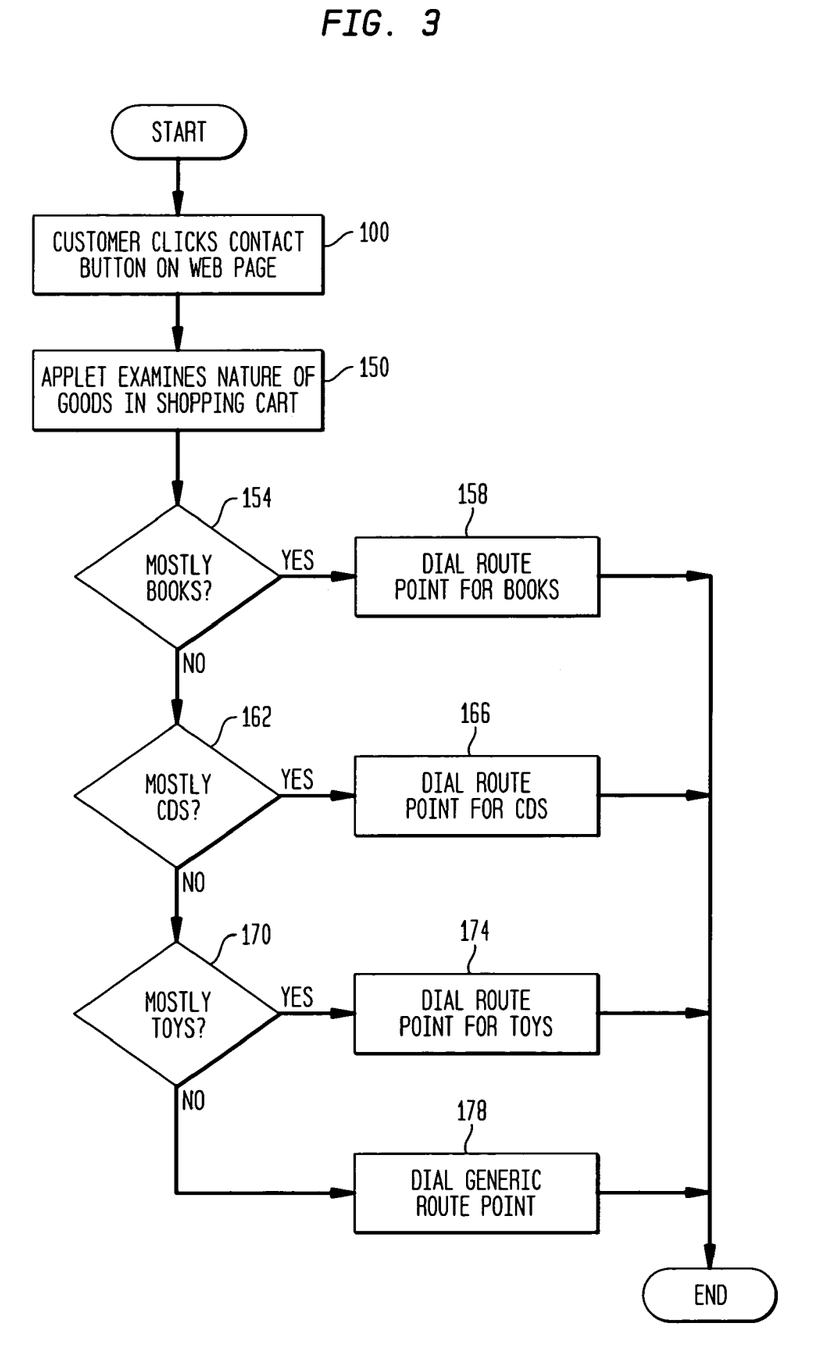
FIG. 3 is a flowchart depicting a method of operation of the contact center according to a third embodiment of the present invention.

FIG. 3 depicts another mode of operation for the architecture of FIG. 1. In this architecture, the evaluator 90 examines the nature or type of items in the data structure 82 to pair the customer with a working agent having the skills to deal with the items and/or complete the order and/or to determine a priority to be assigned to the customer. In box 150, the evaluator 90 examines the data structure 82 to identify the type or nature of items therein. In decision diamond 154, the comparer 84 determines if the items include a first type of item. Although the flowchart uses books as the first type of item, any type of item can be used. If the items include a first type of item, the router 80 in box 158 directs the contact to a queue or route point having agents skilled to service that type of item. In decision diamond 162, the comparer 84 determines if the items include a second type of item. Although the flowchart uses CD's as the second type of item, any type of item can be used. If the items include a second type of item, the router 80 in box 166 directs the contact to a second queue or route point having agents skilled to service that type of item. In decision diamond 170, the comparer 84 determines if the items include a third type of item. Although the flowchart uses toys as the third type of item, any type of item can be used. If the items include a third type of item, the router in box 174 directs the contact to a third queue or route point having agents skilled to service that type of item. In the event that the data structure 82 does not contain any of the first, second, and third items, the router 80 in box 178 directs the contact to a generic (fourth) queue or route point for which no special skills of an agent are required.

As will be appreciated, the architecture of FIG. 3 can be used to identify item types having a high priority or desirability for servicing. For example, certain types of items can have a high success rate for completing sales, a high success rate for cross-selling other items and/or inventory is over-stocked. Alternatively, the architecture can be used to identify low priority items or items that are less desirable for servicing. For example, certain types of items can have a low success rate for completing sales, a low success rate for cross-selling other items and/or a low availability in inventory.

A number of variations and modifications of the invention can be used. It would be possible to provide for some features of the invention without providing others. For example in one alternative embodiment, the router can use information other than or in addition to that set forth above in prioritizing or directing the contact to a pertinent queue. Such information includes one or more of the identification of a customer, a file address associated with the customer (e.g., a cookie), the historical business relationship (or prior business volume) with the customer, and/or an estimated business value of the customer. For example, the latter factor could include the type of entity, wealth or financial resources of the entity and/or geographical location of the entity. In another alternative embodiment, the evaluator analyzes an electronic message, such as a webform, or an e-mail message and determines a value associated with an actual or potential (nonelectronic) order and/or items in the order to permit the router to rout the contact accordingly. In another embodiment, the evaluator input determines the type of request for contact. For example, the router may for high priority contacts cause the agent to contact the customer and for low priority contacts request the customer to call the agent.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\ or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

What is claimed is:

1. A method, comprising:
(a) providing, by a server, on a first communication channel, and as part of a first contact with a customer, the first contact being a potential sales transaction with the customer, at least one web page to a web browser executing on a computer associated with the customer, wherein the customer selects, for possible purchase, a set of one or more items from the provided at least one web page;
(b) receiving, by the server, from the customer, and as part of the same sales transaction, a request for servicing by an agent of a contact center, wherein the servicing is to be effected by a second contact of the contact center with the customer on a second communication channel different from the first communication channel;
(c) downloading, by the server and onto the computer executing the customer's web browser, an applet;
(d) receiving, by the server and from the applet, an evaluation of at least one item in the set of one or more items to identify at least one of (i) an item value and (ii) item type in the set, wherein step (d) is performed by the applet when the applet is being executed by the customer's computer; and
(e) routing, by the server, the request of the customer to a selected agent in the contact center, the selected agent being selected based, at least in part, on the identified at least one of (i) item value and (ii) item type, wherein the set of one or more items is a shopping cart, wish cart, and/or wish list.

2. The method of claim 1, wherein a first contact on the first communication channel is a Web browsing session, wherein the second contact on the second communication channel is one of a live voice communication, an electronic mail message, and a facsimile, wherein the second contact is an outgoing contact from the selected agent to the customer, and wherein part of the first and second contacts overlap temporally.

3. The method of claim 2, wherein the request is an incoming communication from the customer and wherein the routing step is based, at least in part, on item value.

4. The method of claim 1, wherein the request is a request for an outgoing call from the contact center to the customer and wherein the routing step is based, at least in part, on item value.

5. The method of claim 4, wherein the identified item value is contained in a cookie received from the customer's computer.

6. The method of claim 1, wherein the request is associated with the customer's selection of an icon on the at least one web page and wherein the routing step is based, at least in part, on item type.

7. The method of claim 1, wherein the selected routing destination is based, at least in part, on an item value in the set and further comprising:

comparing the item value with a predetermined value to determine the agent destination of the routing step.

8. The method of claim 7, wherein the item value is the highest value of an item in the set.

9. The method of claim 7, wherein the item value is the total value of the items in the set.

10. The method of claim 7, wherein the item value is the average value of the items in the set.

11. The method of claim 1, wherein the selected routing destination is based, at least in part, on a type of item in the set and further comprising:
comparing the item type with a list of items to determine the agent destination of the routing step.

12. The method of claim 1, wherein the selected routing destination is based, at least in part, on both item type and value.

13. A computer readable medium comprising computer executable instructions for performing the steps of claim 1.

14. The method of claim 1, wherein the routing of the customer's request is based, at least in part, on both item type and value.

15. A system, comprising:
a server, executing on a first computer, operable (a) to provide, on a first communication channel and as part of a first contact and a potential sales transaction with a customer, at least one web page to a web browser executing on a second computer associated with the customer, wherein the customer selects, for possible acquisition, a set of one or more items from the provided at least one web page; and (b) to receive, from the customer and as part of the same sales transaction, a request for servicing by an agent of a contact center, wherein the servicing is to be effected by a second contact of the contact center with the customer on a second communication channel different from the first communication channel;
an evaluator operable to evaluate at least one item in the set of one or more items to identify at least one of (i) an item value and (ii) item type in the set; and
a router operable to route the request of the customer to a selected agent in the contact center, the selected agent being selected based, at least in part, on the identified at least one of (i) item value and (ii) item type, wherein the server is operable (c) to effect downloading, onto the second computer executing the customer's web browser, an applet and wherein the applet comprises the evaluator.

16. The system of claim 15, wherein the first communication channel is a Web browsing session, wherein the second contact is one of a live voice communication, an electronic mail message, and a facsimile, and wherein the first an second contacts occur simultaneously.

17. The system of claim 16, wherein the request is an incoming communication from the customer and wherein the at least one of (i) item value and (ii) item type is item value.

18. The system of claim 17, wherein the routing of the customer's request is based, at least in part, on an item value in the set and wherein the identified item value is contained in a cookie received from the customer's computer.

19. The system of claim 15, wherein the set of one or more items is a shopping cart, wish cart, and/or wish list.

20. The system of claim 15, wherein the request is a request for an outgoing call from the contact center to the customer and wherein the at least one of (i) item value and (ii) item type is item value.

21. The system of claim 15, wherein the request is associated with the customer's selection of an icon on the at least one web page and wherein the at least one of (i) item value and (ii) item type is item type.

22. The system of claim 15, wherein the router is operable to compare the item value with a predetermined value to determine the request's routing destination.

23. The system of claim 22, wherein the item value is the highest value of an item in the set.

24. The system of claim 22, wherein the item value is the total value of the items in the set.

25. The system of claim 22, wherein the item value is the average value of the items in the set.

26. The system of claim 15, wherein the routing of the customer's request is based, at least in part, on a type of item in the set and wherein the router is operable to compare the item type with a list of items to determine the request's routing destination.

27. A method for routing contacts in an E-commerce contact center, comprising:
(a) providing, by a server, on a first communication channel, and as part of a potential sales transaction with a customer, at least one web page to a web browser, executing on a computer, associated with the customer, wherein the customer selects, for possible purchase, a set of one or more items from the provided at least one web page;
(b) receiving, by the server, from the customer, and as part of the same sales transaction, a request for servicing by an agent of a contact center, wherein the servicing is to be effected on a second communication channel different from the first communication channel;
(c) downloading, by the server and onto the computer executing the customer's web browser, an applet comprising an evaluator;
(d) evaluating, by the downloaded evaluator, at least one item in the set of one or more items to identify at least one of (i) a value of one or more items and (ii) a type of one or more items in the set;
(e) receiving, by the server, from the downloaded evaluator an identified at least one of (i) a value of one or more items and (ii) a type of one or more items in the set;
(f) routing the request of the customer to a selected agent in the contact center, the selected agent being selected based, at least in part, on the identified at least one of (i) a value of one or more items and (ii) a type of one or more items in the set.

28. The method of claim 27, wherein the first communication channel is a Web browsing session, wherein the web browsing session is a first contact between the contact center and customer, wherein the second communication channel is used by a second contact between the contact center and customer, wherein the second contact is one of a live voice communication, an electronic mail message, and a facsimile, and wherein the first and second contacts occur concurrently.

29. The method of claim 27, wherein the set of one or more items is a shopping cart, wish cart, or wish list.

30. The method of claim 27, wherein the request is an incoming communication from the customer.

31. The method of claim 27, wherein the request is a request for an outgoing call from the contact center to the customer.

32. The method of claim 27, wherein the request is associated with the customer's selection of an icon on the at least one web page.

33. The method of claim 27, wherein the identified at least one of (i) a value of one or more items and (ii) a type of one or more items in the set is contained in a cookie received from the customer's computer.

34. The method of claim 27, wherein the selected routing destination is based, at least in part, on (i) and further comprising:
comparing the item value with a predetermined value to determine the agent destination of the routing step.

35. The method of claim 34, wherein the item value is the highest value of an item in the set.

36. The method of claim 34, wherein the item value is the total value of the items in the set.

37. The method of claim 34, wherein the item value is the average value of the items in the set.

38. The method of claim 27, wherein the selected routing destination is based, at least in part, on (ii) and further comprising:
comparing the item type with a list of items to determine the agent destination of the routing step.

39. The method of claim 27, wherein the selected routing destination is based, at least in part, on both (i) and (ii).

40. A computer readable medium comprising computer executable instructions for performing the steps of claim 27.

41. A method, comprising:
(a) providing, by a server, on a first communication channel, and as part of a first contact with a customer, the first contact being a potential sales transaction with the customer, at least one web page to a web browser executing on a computer associated with the customer, wherein the customer selects, for possible purchase, a set of one or more items from the provided at least one web page;
(b) receiving, by the server, from the customer, and as part of the same sales transaction, a request for servicing by an agent of a contact center, wherein the servicing is to be effected by a second contact with the customer on a second communication channel different from the first communication channel;
(c) receiving, by the server, an evaluation of at least one item in the set of one or more items to identify at least one of (i) an item value and (ii) item type in the set; and
(d) routing, by the server, the request of the customer to a selected agent in the contact center, the selected agent being selected based, at least in part, on the identified at least one of (i) item value and (ii) item type, wherein the set of one or more items is a shopping cart, wish cart, and/or wish list.

42. The method of claim 41, wherein step (c) comprises:
analyzing a web form to evaluate the at least one item in the set of one or more items.

43. The method of claim 41, further comprising:
downloading, onto the computer executing the customer's web browser, an applet, wherein the applet evaluates the at least one item in the set of one or more items.

44. The method of claim 41, wherein a first contact on the first communication channel is a Web browsing session, wherein the second contact on the second communication channel is one of a live voice communication, an electronic mail message, and a facsimile, wherein the second contact is an outgoing contact from the selected agent to the customer, and wherein part of the first and second contacts overlap temporally.

45. The method of claim 41, wherein the request is an incoming communication from the customer, wherein the request is a request for an outgoing call from the contact center to the customer, and wherein the routing step is based, at least in part, on item value.

46. The method of claim 41, wherein the request is associated with the customer's selection of an icon on the at least one web page and wherein the routing step is based, at least in part, on an identified item value in the set.

47. The method of claim 46, wherein the identified item value is contained in a cookie received from the customer's computer.

48. The method of claim 41, wherein the request is associated with the customer's selection of an icon on the at least one web page and wherein the routing step is based, at least in part, on an identified item type in the set.

49. The method of claim 41, wherein the selected routing destination is based, at least in part, on an identified item value in the set and further comprising:
comparing the identified item value with a predetermined value to determine the agent destination of the routing step.

50. The method of claim 49, wherein the item value is the highest value of an item in the set.

51. The method of claim 49, wherein the item value is the total value of the items in the set.

52. The method of claim 49, wherein the item value is the average value of the items in the set.

53. The method of claim 41, wherein the selected routing destination is based, at least in part, on an identified type of item in the set and further comprising:
comparing the item type with a list of items to determine the agent destination of the routing step.

54. The method of claim 41, wherein the selected routing destination is based, at least in part, on both item type and value.

55. A computer readable medium comprising computer executable instructions for performing the steps of claim 41.

56. A contact center, comprising:
a plurality of agents to service contacts from customers; and
a server operable to:
(a) provide, on a first communication channel and as part of a first contact with a customer, the first contact being a potential sales transaction with the customer, at least one web page to a web browser associated with the customer, wherein the customer selects, for possible purchase, a set of one or more items from the provided at least one web page;
(b) receive, from the customer and as part of the same sales transaction, a request for servicing by a selected agent of the contact center, wherein the servicing is to be effected by a second contact with the customer on a second communication channel different from the first communication channel;
(c) receive an evaluation of at least one item in the set of one or more items to identify at least one of (i) an item value and (ii) item type in the set; and
(d) route the request of the customer to an agent in the contact center, the agent being selected based, at least in part, on the identified at least one of (i) item value and (ii) item type, wherein the set of one or more items is a shopping cart, wish cart, and/or wish list.

57. The contact center of claim 56, wherein an evaluator analyzes a web form to evaluate the at least one item in the set of one or more items.

58. The contact center of claim 56, further comprising:
an applet, executing on a computer of the customer, wherein the applet evaluates the at least one item in the set of one or more items.

59. The contact center of claim 56, wherein a first contact on the first communication channel is a Web browsing session, wherein the second contact on the second communication channel is one of a live voice communication, an electronic mail message, and a facsimile, wherein the second contact is an outgoing contact from the selected agent to the customer, and wherein part of the first and second contacts overlap temporally.

60. The contact center of claim 59, wherein the request is an incoming communication from the customer, wherein the request is a request for an outgoing call from the contact center to the customer, and wherein the routing operation is based, at least in part, on item value.

61. The contact center of claim 56, wherein the request is associated with the customer's selection of an icon on the at least one web page and wherein the routing operation is based, at least in part, on an identified item value in the set.

62. The contact center of claim 61, wherein the identified item value is contained in a cookie received from the customer's computer.

63. The contact center of claim 56, wherein the request is associated with the customer's selection of an icon on the at least one web page and wherein the routing operation is based, at least in part, on an identified item type in the set.

64. The contact center of claim 56, wherein the selected routing destination is based, at least in part, on an identified item value in the set and further comprising:
   a comparer to compare the item value with a predetermined value to determine the agent destination of the routing step.

65. The contact center of claim 64, wherein the item value is the highest value of an item in the set.

66. The contact center of claim 64, wherein the item value is the total value of the items in the set.

67. The contact center of claim 64, wherein the item value is the average value of the items in the set.

68. The contact center of claim 56, wherein the selected routing destination is based, at least in part, on an identified type of item in the set and further comprising:
   a comparer to compare the item type with a list of items to determine the agent destination of the routing step.

69. The contact center of claim 56, wherein the selected routing destination is based, at least in part, on both item type and value.

* * * * *